United States Patent [19]

Kawai

[11] Patent Number: 4,724,680
[45] Date of Patent: Feb. 16, 1988

[54] AIR CONDITIONING APPARATUS AND CONTROL METHOD THEREOF

[75] Inventor: Nobuo Kawai, Fujinomiya, Japan

[73] Assignee: Kabushiki Kaisha Toshiba, Kawasaki, Japan

[21] Appl. No.: 932,340

[22] Filed: Nov. 19, 1986

[30] Foreign Application Priority Data

Dec. 28, 1985 [JP] Japan .................. 60-266008

[51] Int. Cl.$^4$ .............................. F25B 1/00
[52] U.S. Cl. .................. 62/115; 62/228.4; 318/779; 318/807
[58] Field of Search .......... 62/228.4, 229, 226, 62/115; 417/45; 318/779, 787, 806, 807; 361/22

[56] References Cited

U.S. PATENT DOCUMENTS

| 4,422,030 | 12/1983 | McAllise | 318/806 X |
| 4,451,112 | 5/1984 | Hattori et al. | 318/806 X |
| 4,662,185 | 5/1987 | Kobayashi et al. | 62/229 X |

FOREIGN PATENT DOCUMENTS

| 55-3577 | 11/1980 | Japan . | |
| 56-134561 | 3/1981 | Japan . | |
| 57-162981 | 4/1982 | Japan . | |
| 0054789 | 3/1984 | Japan | 417/45 |
| 0142140 | 7/1985 | Japan | 62/228.4 |

Primary Examiner—William E. Wayner
Attorney, Agent, or Firm—Oblon, Fisher, Spivak, McClelland & Maier

[57] ABSTRACT

An air conditioning apparatus includes a variable frequency power source device for providing an AC electric power with a variable frequency, a variable capacity compressor driven by the AC electric ipower and a starting detector for detecting a starting state of the compressor a predetermined time after the compressor is energized. When the starting detector detects the starting failure of the compressor, the variable frequency power source device feeds the compressor with a starting frequency voltage until the starting detector detects changes in the level of the input current to the compressor within a predetermined time to heat refrigerant in the compressor, and then feeds the compressor with a driving frequency voltage corresponding to the required air conditioning load. When no change in the level of the input current is detected within the predetermined time, the variable frequency power source device supplys the compressor with the driving frequency voltage immediately after the predetermined time elapsed.

15 Claims, 7 Drawing Figures

AIR CONDITIONING APPARATUS AND CONTROL METHOD THEREOF

BACKGROUND OF THE INVENTION

1. Field of the invention

The present invention relates, in general, to air conditioning apparatus. More specifically, the invention relates to an air conditioning apparatus including a variable capacity compressor. The capacity of the compressor is changed through an inverter device in response to changes of an air conditioning load within a certain space.

2. Description of the prior art

Air conditioning apparatus including a variable capacity compressor, an inverter device and a control circuit, such as, e.g., a microcomputer, can vary its cooling/heating capacity by varying the speed of the compressor in response to changes in the air conditioning load.

The microcomputer outputs a digital signal to the inverter device when the microcomputer detects the change of the actual temperature with reference to a predetermined set value temperature.

The frequency of the AC voltage produced from the inverter device is varied on the basis of the digital signal from the microcomputer. The AC voltage from the inverter device is fed to the drive motor of the compressor, and the rotational speed of the drive motor is then varied in accordance with the AC voltage. The cooling or heating capacity of the air conditioning apparatus depends on the rotational speed of the compressor.

Figure 1:
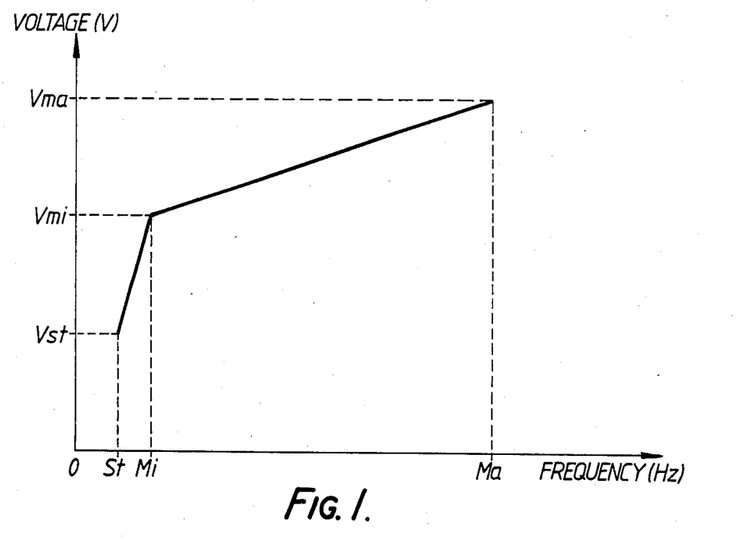
FIG. 1 is a graph showing a relationship between the voltage and the frequency of an inverter device used in one embodiment of the present invention.

FIG. 1 is a graph illustrating the relationship between the output frequency and the output voltage of the inverter device of the air conditioning apparatus, as described above.

As can be seen in FIG. 1, the output voltage of the inverter device rises on a straight line path from the low voltage Vmi to the high voltage Vma between the minimum frequency Mi Hz and the maximum frequency Ma Hz. A large torque is generated within this range. Therefore, the motor of the compressor can be driven in a stable condition by the torque described above. On the other hand, the torque is smaller between the starting frequency St Hz at which the motor of the compressor begins to rotate and the minimum frequency Mi Hz. This is because the output voltage of inverter device between Mi Hz and St Hz is lower in comparison with the voltage between St Hz and Ma Hz.

The starting control operation of a conventional air conditioning apparatus will be described with reference to FIG. 2.

A control device composed of a microcomputer calculates a target frequency Ta Hz between the minimum frequency Mi Hz and the maximum frequency Ma Hz on the basis of the difference between a desired room temperature and a present room temperature. The control device outputs a digital starting signal to an inverter device. Based on the stating signal, the inverter device feeds the motor of the compressor with an output which gradually rises from the starting frequency St Hz to the target frequency Ta Hz. If the inverter device outputs the target frequency Ta Hz immediately after receiving the starting signal, a large amount of the starting current is needed.

During winter, since the compressor is usually installed outside house, the viscosity of the lubricating oil in the compressor is high. Furthermore, the refrigerant of the refrigerating cycle is in liquid form and is accumulated undre the lubricating oil because of its larger specific gravity.

Therefore, the friction between the rotating or sliding mechanical parts of the compressor is high, and thus the starting load is increased.

Figure 2:
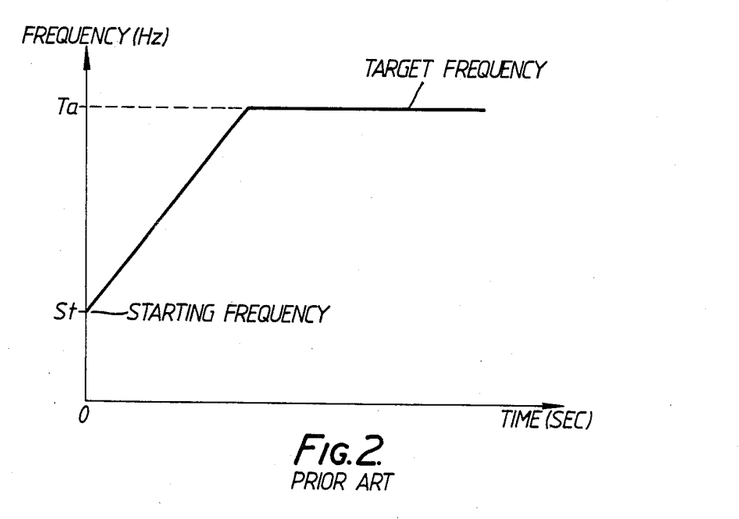
FIG. 2 is a graph showing the frequency variation input to a motor in a conventional device.

Under this state, if the invertor device provides the output, as shown in FIG. 2, to the motor of the compressor, the compressor often fails to start because of the small starting torque and the high frictional resistance, as described above.

SUMMARY OF THE INVENTION

It is an object of the invention to provide an improved air conditioning apparatus in which a compressor may begin to rotate readily under a heavy starting load under low temperature conditions.

It is another object of the invention to provide an improved control method for controlling the starting of the compressor.

To attain the above objects, there is provided an air conditioning apparatus comprising a variable capacity compressor including a motor for compressing refrigerant, a starting detector for detecting the starting state of the variable capacity after a predetermined starting interval and a a maintaining circuit for maintaining the voltage to the compressor at a specified level frequency in response to the detection result of the starting detector. The maintaining circuit includes a control circuit for controlling the speed of the compressor.

The control circuit includes a variable frequency power source device for supplying the motor with a starting frequency voltage. When a starting failure of the compressor is detected by the starting detector, the variable frequency power source device feeds the motor with the starting frequency voltage until the starting detector detects the changes in the level of the input current to the compressor within a predetermined period of time to heat refrigerant in the compressor.

BRIEF DESCRIPTION OF THE DRAWINGS

The present invention is best understood with reference to accompanying drawings in which.

DETAILED DESCRIPTION OF THE PREFERRED EMBODIMENT

A preferred embodiment of the present invention will be now described in more detail with reference to the accompanying drawings.

Figure 3:
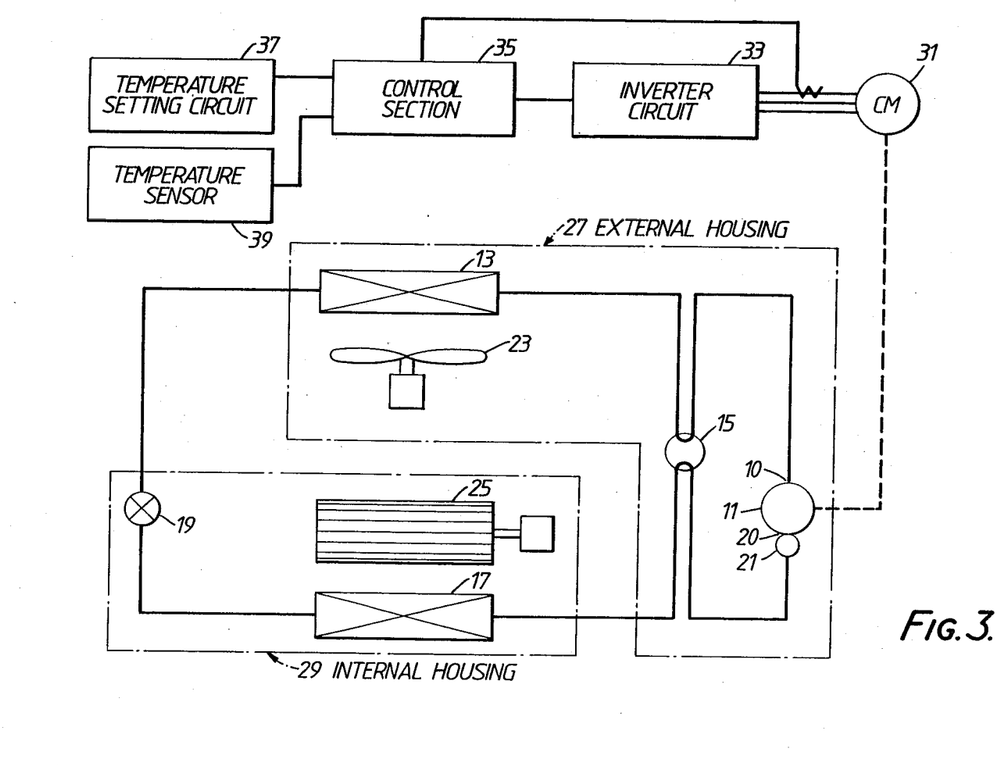
FIG. 3 is a schematic view illustrating a refrigerating cycle and the control part of one embodiment.

FIG. 3 is a schematic view of one embodiment of the present invention.

Firstly, a refrigerating cycel arrangement is described hereinafter. The output side 10 of a variable capacity compressor 11 is connected to an external heat-exchanger 13 through a four-way valve 15 for fluid communication. External heat-exchanger 13 is connected to an internal heat-exchanger 17 through an expansion valve 19 for fluid communiction. Internal heat-exchanger 17 and the input side 20 of compressor 11 are also connected to one another in a fluid communication state through four-way valve 15 and an accumulator 21. Four-way valve 15 selectively provides refrigerant from output side 10 of compressor 11 to either external heat-exchanger 13 or internal heat-exchanger 17 by operation of a HEAT/COOL key (not shown).

Four-way valve 15 provides refrigerant from output side 10 of compressor 11 to external heat-exchanger 13 during cooling. Four-way valve 15, on the other hand, provides refrigerant from output side 10 of compressor 11 to internal heat-exchanger 17 during heating.

An external fan 23 and an internal fan 25 are respectively provided opposite to the corresponding heat-exchangers 13 and 17.

Compressor 11, four-way valve 15, external heat-exchanger 13, external fan 23 and accumulator 21 are generally built in an external housing 27. Internal heat-exchanger 17, internal fan 25 and expansion valve 19 also are built in an internal housing 29.

In FIG. 3, compressor 11 includes a compressor motor 31 which is driven by an AC output of a variable frequency power source such as an inverter circuit 33. The revolutional speed of motor 31 may be changed by varying the frequency of a quasi-sine wave AC voltage of inverter circuit 33. As a result, the capacity of compressor 11 can be changed.

The frequency of the AC voltage output of inverter circuit 33 is controlled by a control section 35. Control section 35 receives an output from a temperature setting circuit 37 in which a desired temperature may be set by a user. Control section 35 also receives an output from a temperature sensor 39 which detects the temperature in the space tobe heated, and determines the frequency of the AC voltage output of inverter circuit 33 by comparing the output of temperature setting circuit 37 with the output of temperature sensor 39.

Control section 35 comprises a microcomputer including ROM (read only memory) 43 and RAM (random access memory) 45. The microcomputer calculates the difference between the desired temperature set by the user and the actual temperature detected by temperature sensor 39. Furthermore, the microcomputer determines the appropriate temperature difference zone from a plurality of temperature diffrence zones stored in RAM 45 into which the calculated temperature difference value falls. Based on the determined temperature difference zone, a corresponding target frequency instruction signal from plurality of predetermined target frequency instruction signals are previously stored in RAM 45 is fed from control section 35 to inverter circuit 33. Each target frequency instruction signal corresponds to an individual temperature difference zone.

When inverter circuit 33 receives the target frequency instruction signal from control section 35, an AC voltage output with a frequency corresponding to the target frequency instruction signal is provided from inverter circuit 35 to motor 31.

Based on the relationship between the temperature difference zone and the target frequency, when the air conditioning load is small, that is, a small temperature difference zone, the target frequency is low. The target frequency increases to a high frequency in proportion to increases in the air conditioning load. Accordingly, each target frequency corresponding to an individual temperature difference zone is determined between the minimum frequency Mi Hz and the maximum frequency Ma Hz as shown in FIG. 1. The above-described target frequency control system is disclosed in U.S. Pat. No. 4,407,139, issued Oct. 4, 1983, in the names of Yuuichi Ide and Harunobu Nukushina, and entitled METHOD FOR CONTROLLING AN AIR CONDITIONING SYSTEM.

A starting control operation is described with reference to FIGS. 4, 5 and 6.

Figure 4:
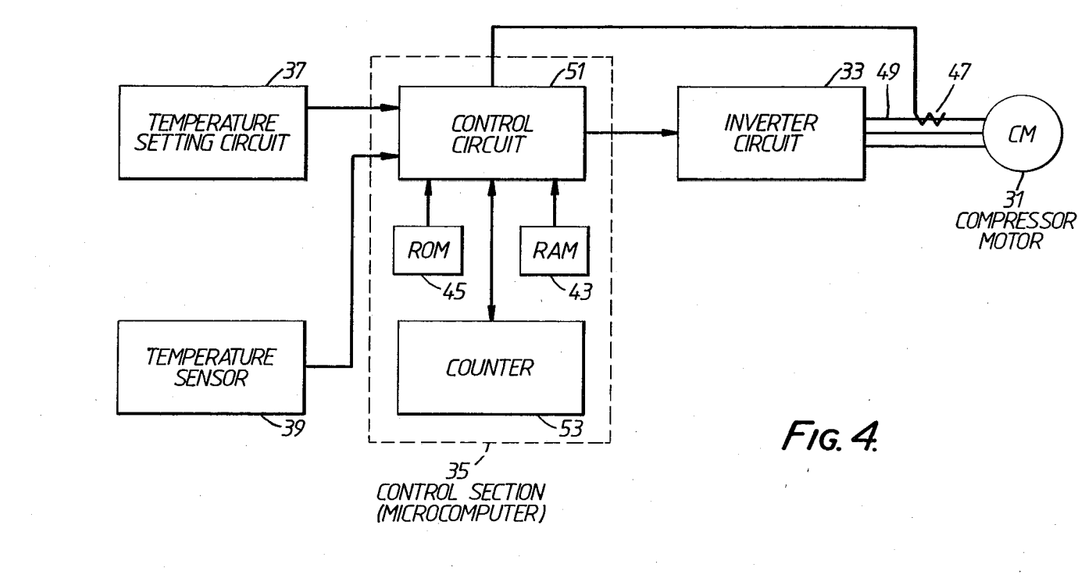
FIG. 4 is a schematic view of the control part shown in FIG. 3.

As can be seen in FIG. 4, a starting detector 47 is attached to one of the wires 49 between inverter circuit 33 and motor 31 to serve as a magnetic coupling. Starting detector 47 detects a starting current Im of motor 31 when motor 31 begins to rotate. The output of starting detector 47 is fed to a control circuit 51. Control circuit 51 compares the output data of starting detector 47 with the prescribed current data Is which is previously stored in RAM 45, and determines whether the starting operation of motor 31 is normal.

Figure 5:
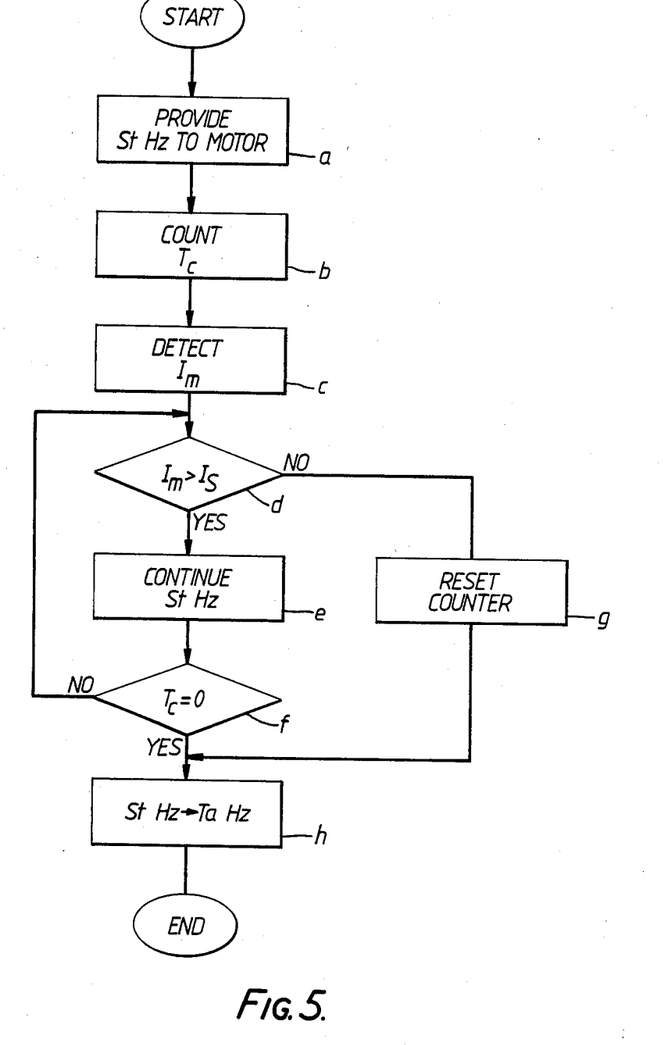
FIG. 5 is a flow chart for explaining the starting control operation of one embodiment.
Figure 6A:
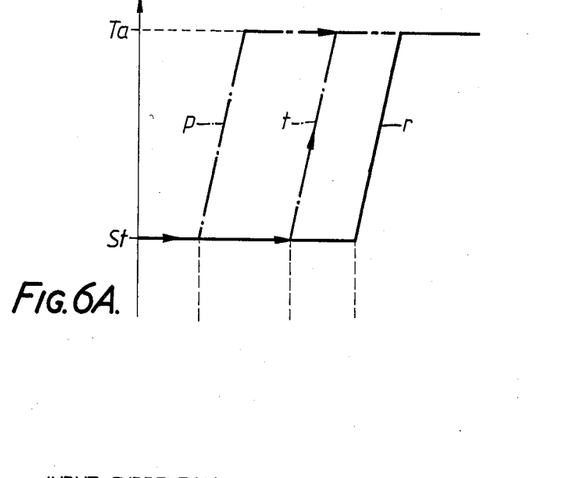
FIG. 6A and 6B are graphs showing the frequency variation and the current variation input to a compressor motor used in one embodiment.

During starting of motor 31, inverter circuit 33 provides the AC output voltage Vst with the starting frequency St Hz, as shown in FIG. 1, to motor 31 (step a of the flow-chart in FIG. 5). At this time, a counter 53, as shown in FIG. 4, begins its counting action (step b). Motor 31 begins to rotate, and the input current Im rapidly increases, as shown in FIG. 6B. Since compressor 11 normally starts by overcoming the initial load of the refrigerating cycle arrangement, and then reaches a stable state, the input current Im rapidly decreases, as indicated by a dot-dash curved line O in FIG. 6B. The input current Im drops below the prescribed current Is, and stabilizes. Starting detector 43 detects the above-described current changes of the input current Im, and outputs the detection signal to control circuit 51 (step c) when the current Im has stabilized. In decision step d, control circuit 51 compares the detection signal data Im from starting detector 43 with the prescribed current data Is. If the prescribed current data Is is smaller than the detection signal data Im, the NO-path is taken. Otherwise the YES-path is taken. If the NO-path is taken, the counting action of counter 53 is stopped, and the content thereof is reset (step g). After that, in step h, inverter circuit 33 changes the output frequency from the starting frequency St Hz to the target frequency Ta Hz, as indicated by a dot-dash line P in FIG. 6A, and supplys it to motor 31. Motor 31 is driven by the target frequency Ta Hz corresponding to the air conditioning load.

Figure 6B:
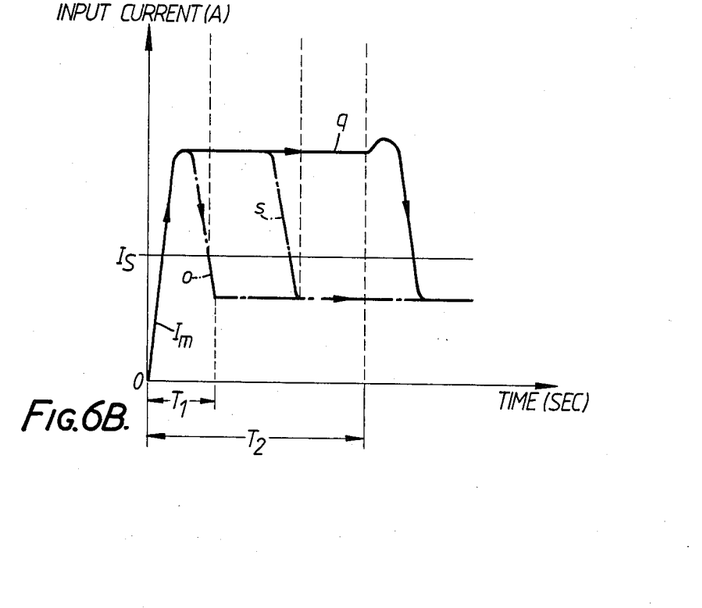

On the other hand, if compressor 11 cannot overcome the initial load of the refrigerating cycle arrangement by the starting frequency St Hz, the input current Im larger than the prescribed current Is flows continuously, as indicated by a solid line q in FIG. 6B. If starting detector 47 detects such continuous flow of the input current Im, and control circuit 51 determines that the input current Im is larger than the prescribed current value Is, the YES-path is taken in decision step d. In steps e and f, inverter circuit 33 provides the starting frequency St Hz to motor 31 until counter 53 achieves the count value Tc. The count value Tc corresponds to a predetermined period of time T, as shown in FIG. 6B. Accordingly, the input current Im flows in the windings of motor 31 for the predetermined period of time T, and the temperature of the windings of motor 31 rises.

As the temperature of the windings of motor 31 rises, compressor 11 is also heated. Therefore, the viscosity of the lubricating oil in compressor 11 becomes lower, and the liquid refrigerant accumulated under the lubricating oil is gasified, thus decreasing the initial load in the refrigerating cycle.

Immediately after counter 53 achieves the count value Tc, inverter circuit 33 changes the output frequency from the starting frequency St Hz to the target frequency Ta Hz (step h), as indicated by a solid line r in FIG. 6B, and supplys it to motor 31. As a result, motor 31 can begin to rotate smoothly because of the small initial load of compressor 11.

It should be noted that if starting detector 47 detects the current decrease of input current Im below the prescribed current value Is, as indicated by a dot-dash curved line s in FIG. 6B, before the output of counter 53 achieves the count value Tc, inverter circuit 33 immediately changes the output frequency from the starting frequency St Hz to the target frequency Ta Hz, as indicated by a dot-dash line t in FIG. 6A, and supplys the target frequency Ta Hz to motor 31.

The predetermined period of time T, as a matter of course, is less than the period of time between the feeding of the starting frequency St Hz to motor 31 and the time when the windings of motor 31 begin to melt or burn. The above-described starting frequency St Hz corresponds to the initial rotational speed of motor 31. Thus the starting frequency St Hz may be obtained from experimental results. This is because the starting frequency St Hz depends on the type of compressor, such as, e.g., rotary type or reciprocating type and the design specifications of the refrigeration cycle, such as, e.g., the capacity of the heat-exchanger, etc.

According to the above-described embodiment, since a starting detector is employed for detecting the starting state of a compressor motor when the motor is energized by an inverter circuit, a stable starting operation of the compressor always may be carried out even if the external temperature is low.

The present invention has been described with respect to a specific embodiment. However, other embodiments based on the principles of the present invention should be obvious to those of ordinary skill in the art. Such embodiments are intended to be covered by the claims.

What is claimed is:

1. An air conditioning apparatus comprising:
    variable capacity compressor means for compressing refrigerant;
    starting detector means for detecting the starting state of the compressor means after a predetermined starting interval; and
    means for maintaining the voltage to the compressor means at a specified starting frequency level in response to the detection result of the starting detector means within a predetermined time.

2. An apparatus according to claim 1, wherein the maintaining means includes control means for controlling the speed of the compressor means.

3. An apparatus according to claim 2, wherein the starting detector meams includes a current detection means for detecting changes in the level of the input current, representing the starting state of the compressor means, to the compressor means.

4. An apparatus according to claim 3, wherein the compressor means includes a compressor and variable speed motor means for driving the compressor.

5. An apparatus according to claim 4, wherein the control means includes variable frequency power source means for supplying the motor means with a driving frequency voltage corresponding to a required air conditioning load.

6. An apparatus according to claim 5, wherein the variable frequency power source means includes starting means for supplying the voltage at the specified starting frequency level to the motor means until the current detection means detects changes in the level of the input current to the compressor within the predetermined time when no change in input current level is detected by the starting detector means after the starting interval.

7. An apparatus according to claim 6, wherein the variable frequency power source means also includes means for supplying a voltage at a specified driving frequency level to the motor means after the predetermined time.

8. An apparatus according to claim 6, wherein the variable frequency power source means includes driving means for supplying a voltage at a specified driving frequency level to the motor means when a change in the input current level is detected by the starting detector means after the starting interval.

9. An apparatus according to claim 2, wherein the control means includes counter means for measuring the elapsed time from initial application of the input current to the compressor means.

10. An apparatus according to claim 6, wherein the control means also includes a random access memory means for storing the starting interval, the predetermined time and the prescribed starting level frequency voltage.

11. An apparatus according to claim 4, wherein the control means includes variable frequency power source means for supplying the motor means with a driving frequency voltage corresponding to a required air conditioning load, the power source means feeding the motor means with a specified starting level frequency voltage for the predetermined time when no change in the input current level is detected by the current detection means after the predetermined starting interval.

12. An air conditioning apparatus comprising:
    variable capacity compressor means for compressing refrigerant;
    starting current detector means for detecting changes of more than a preset amount in the level of the input current to the compressor means; and
    means for maintaining the voltage to the compressor means at a specified starting frequency level in response to the detection result of the starting current detector means.

13. A method for controlling an air conditioning apparatus, having a compressor motor and a counter, comprising the steps of:
    supplying a starting frequency voltage to the compressor motor;
    generating a time counting output with the counter;
    detecting the input current to the motor after a predetermined starting interval;
    maintaining the starting frequency voltage to the compressor motor at a specified frequency level when the level of the input current detected is larger than a predetermined current level; and
    changing the voltage to the motor from the starting frequency voltage to a different driving frequency voltage, greater than the starting frequency voltage, corresponding to a required air conditioning load when either the time counting output of the counter achieves a predetermined value or the level of the input current detected is less than the predetermined current level.

14. A method according to claim 13, wherein the changing step includes the step of resetting the counter when the input current detected is less than the predetermined current level.

15. A method for controlling an air conditioning apparatus, having a compressor motor and a counter, comprising the steps of:

supplying a starting frequency voltage to the compressor motor;

generating a time counting output with the counter;

detecting the input current to the motor after a predetermined starting interval;

resetting the counter when the input current detected is less than the predetermined current level; and changing the voltage to the motor from the starting frequency voltage to a different driving frequency voltage, greater than the starting frequency voltage, corresponding to a required air conditioning load.

* * * * *

UNITED STATES PATENT AND TRADEMARK OFFICE
CERTIFICATE OF CORRECTION

PATENT NO. : 4,724,680

DATED : Feb. 16, 1988

INVENTOR(S) : Nobuo Kawai

It is certified that error appears in the above-identified patent and that said Letters Patent is hereby corrected as shown below: On the Title Page, Item [30]

-- Priority information is incorrectly recorded.
It should read:

Nov. 28, 1985 [JP] Japan.............60-266008

Signed and Sealed this

Twenty-sixth Day of July, 1988

Attest:

DONALD J. QUIGG

Attesting Officer

Commissioner of Patents and Trademarks